Aug. 28, 1923.
W. M. WIRE
EGG CARRIER
Filed Dec. 2, 1921
1,466,326
2 Sheets-Sheet 1
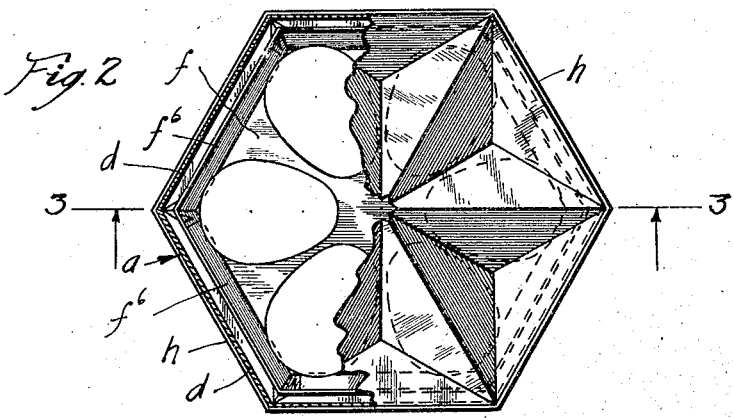
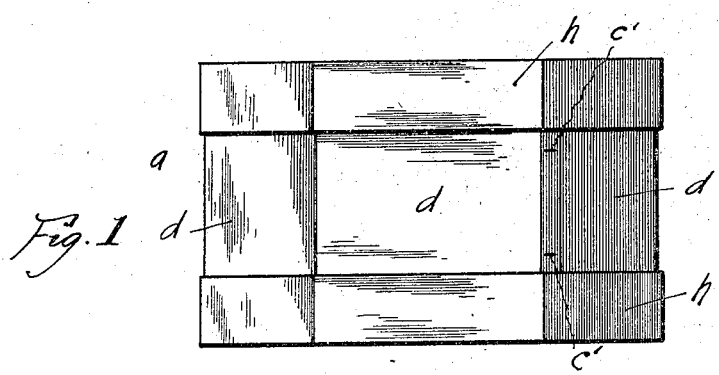
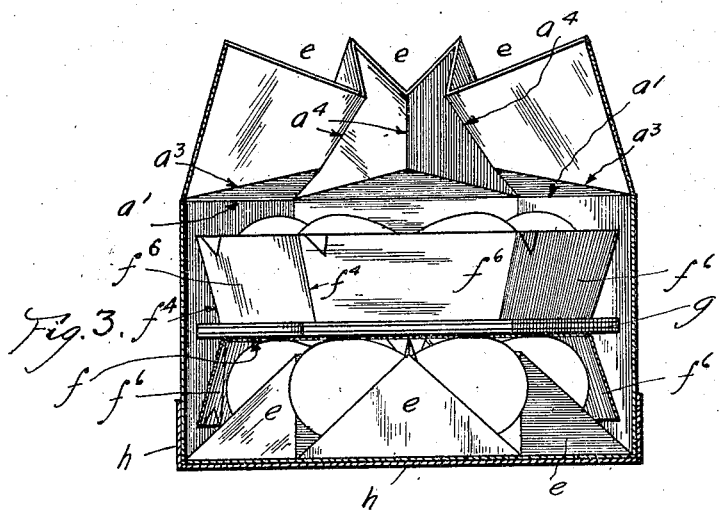
Inventor
Wesley M Wire Aug. 28, 1923.

W. M. WIRE

EGG CARRIER

Filed Dec. 2, 1921

Inventor:
Wesley M Wire.
by  Atty.

Patented Aug. 28, 1923.

1,466,326

UNITED STATES PATENT OFFICE.

WESLEY M. WIRE, OF NEWBERG, OREGON.

EGG CARRIER.

Application filed December 2, 1921. Serial No. 519,399.

*To all whom it may concern:*

Be it known that I, WESLEY M. WIRE, a citizen of the United States, and a resident of Newberg, Yamhill County, State of Oregon, have invented a new and useful Improvement in Egg Carriers, of which the following is a specification.

My invention relates to improvements in egg carriers adapted for shipment by parcel post. One of the main objects of my invention is to provide a device of this character which may be economically constructed, and put together with minimum labor, and of such a nature as to efficiently protect the eggs from being broken by the handling of the carrier in shipping and in transit.

Another purpose of my invention is to adapt my carrier to carry the eggs in as compact a parcel as possible. I attain my purpose by constructing my carrier of a collapsible outer case having telescopic inwardly foldable top and bottom ends, and providing an egg tray, or preferably two egg trays arranged inverted to each other, in said outer case. I further make each tray collapsible, so that each tray is adapted to hold one-half of the quantity of eggs to be packed in my carrier; and said telescopic foldable ends of the outer case, when pressed in, constitute individual egg spacing cells holding the eggs apart in their tray.

The above mentioned features and others incidental thereto are hereinafter fully described, reference being had to the accompanying drawings, in which:

Fig. 1 is a side elevation of my improved egg carrier, showing the same in its assembled position ready for shipment;

Fig. 2 is a plan view of the same with part of the top broken away, to show details of construction;

Fig. 3 is a vertical section taken approximately on line 3—3 of Fig. 2; this view illustrates the manner in which the eggs are yieldingly held in their protected position; the top end being shown partially collapsed;

Figure 4:
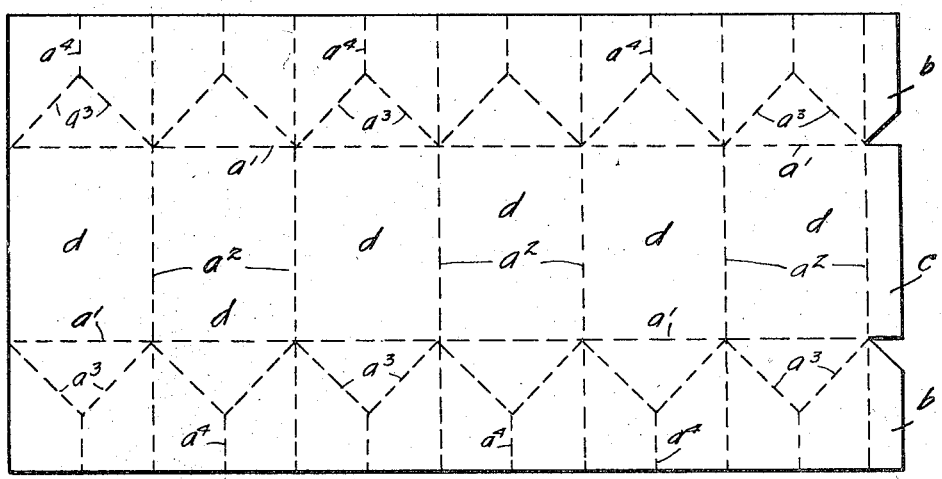
Fig. 4 is a view of the blank from which the outer case is made; the broken lines of this figure indicating creases.
Figures 5, 6:
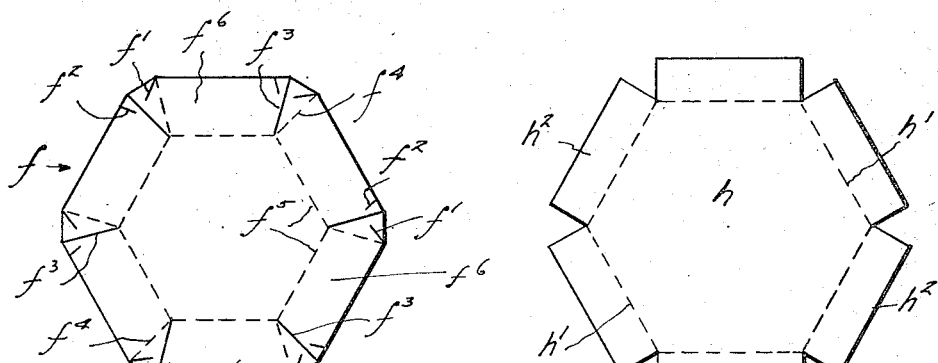
Fig. 5 is a view showing the blank from which one of the trays upon which the eggs rest is made the full lines indicating cuts, and the broken lines creases.
Fig. 6 is a view similar to Fig. 5, showing the development of one of the end covers of the case.
Figure 7:
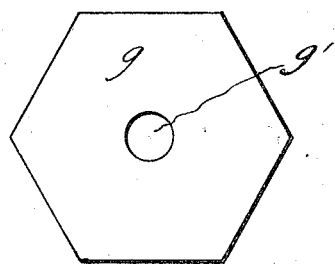
Fig. 7 is a plan view of the resilient partition placed between the adjacent bottoms of the inverted trays.

The outer case $a$, consists of a rectangular piece of card-board, creased along the lines $a'$, $a^2$, $a^3$, $a^4$, and provided at one end with extension portions $b$, $c$. The creases are so made that when the ends of the rectangular pieces are brought together the structure will be in the form of a hexagonal right prism. The extension members, $b$, $c$, provide a place for stapling, as at $c'$, in Figs. 1 and 2. The creased lines $a'$, $a^2$ will separate the lateral faces $d$, while the creased lines $a^3$, $a^4$ will adapt the portions above and below the lateral faces $d$ to be folded and telescoped inwardly to form the pyramid shaped partitions $e$ (see Figs. 2 and 3) which separate the eggs. Two trays $f$ (the development of which is shown in Fig. 5) have their edges provided with slits $f'$, $f^2$, $f^3$ and creases $f^4$, $f^5$. The hexagon bound by the creases $f^5$ forms the bottom of the tray, the sides $f^6$ of the tray being inclined towards the bottom and held together by the interlocking slits $f'$, $f^2$. The set-up tray is shown in side elevation in Fig. 3, and in this particular structure is adapted to hold six eggs.

The partition $g$ consists of a hexagonal piece preferably consisting of two sheets having an intermediate corrugated portion rendering this portion yielding. Said partition $g$ is made with a central hole $g'$ which makes it more easily removable. The top and bottom covers $h$ (see Fig. 6) are creased along the lines $h'$, the hexagon included by these lines being adapted to fit snugly over the ends of the box. The side members $h^2$ may then be folded laterally and the whole structure securely tied.

The box is packed as follows: The trays are placed with adjacent bottoms separated by the partitions $e$; six eggs are then placed in the tray (illustrated in Fig. 3); the top is then folded and telescoped inward to the position shown in Fig. 2. The pyramid shaped portions, $e$, will work their vertices up between the adjacent eggs, thereby spacing these eggs apart. One of the covers $h$ is then placed over this top portion and the whole structure turned over to the position shown in Fig. 3, which places the filled tray in an inverted position and the empty tray in an upright position. The latter is then filled, the top portion of the box folded and telescoped inwardly in the manner similar to the other end, and the cover $h$ placed over this top, whereupon the device is tied securely together.

I claim:

1. An egg carrier comprising an outer casing provided with a top having creasings arranged to adapt said top to be folded and telescoped inward; and an egg-holding tray placed within said outer casing; said creased portion of the top of the outer casing, when inwardly folded and telescoped, providing a plurality of radially arranged individual cells, spacing the eggs in the tray apart.

2. An egg carrier comprising an outer case provided with top and bottom ends having creasings arranged to adapt said ends to be folded and telescoped inward, and an egg holding tray placed at each end of said outer case and within the said inwardly foldable and telescopic ends, the egg trays being arranged inverted to each other, and said ends of the outer case, when inwardly folded and telescoped, providing a plurality of radially arranged individual cells spacing the eggs in the trays apart.

3. An egg carrier comprising a collapsible outer case provided with top and bottom ends having creasings arranged to adapt said ends to be folded and telescoped inward, and an egg holding collapsible tray placed at each end of said outer case and within the said inwardly foldable and telescopic ends, the egg trays being arranged inverted to each other, and said ends of the outer case, when inwardly folded and telescoped, providing a plurality of radially arranged individual cells spacing the eggs in the trays apart.

4. An egg carrier comprising a collapsible outer case provided with top and bottom ends having creasings arranged to adapt said ends to be folded and telescoped inward, and egg holding collapsible tray placed at each end of said outer case and within the said inwardly foldable and telescopic ends, the egg trays being arranged inverted to each other, and a resilient partition located between said egg holding trays; said ends of the outer case, when inwardly folded and telescoped, providing a plurality of radially arranged individual cells spacing the eggs in the trays apart.

WESLEY M. WIRE.